INVENTOR.

BY

United States Patent Office 3,106,529
Patented Oct. 8, 1963

3,106,529
APPARATUS FOR SEPARATING A MIXTURE
INTO ITS COMPONENTS
Pieter Marinus van der Meer, Gemaalweg 6,
Lemmer, Netherlands
Filed Jan. 11, 1960, Ser. No. 1,570
Claims priority, application Netherlands Jan. 12, 1959
5 Claims. (Cl. 210—511)

The present invention relates to apparatus for separating liquid components in a liquid mixture and for separating solids by weight in a liquid.

It is known to separate heavier solid or fluid parts from a liquid, in centrifuges or by allowing the heavier parts to settle. Centrifuges, however, are fairly costly both in initial cost and in the cost of maintenance while settling methods are time consuming and require large apparatus.

It is an object of the present invention to provide an apparatus having extremely good separating properties while being small and of simple construction. Moreover, maintenance is limited to replacement of a single, simple, easily replaceable part.

With the foregoing object in view, the apparatus provided in accordance with the invention for separating a mixture of a first liquid and another heavier liquid and/or a heavier solid into its components comprises a generally closed vessel, the wall of which is provided with a passage. Opposite the passage is a nozzle from which the mixture can be discharged under pressure in a cylindrical flow, the area of the passage in the vessel being twice as large as the cross-sectional area of the nozzle. It is to be especially noted that the distance from the nozzle to the passage and the pressure of the liquid does not affect the operation of the device with respect to separation, since the only condition which is to be met is that the cross-section of the flow from the nozzle be cylindrical at said passage and that the area of said passage be twice that of the cylindrical cross-section.

The apparatus according to the invention may also be constructed such that a sharply tapering collar is provided which extends towards the axis of the flow of the mixture. The collar has a sharp portion which is downwardly inclined and which part may be either straight or curved.

Furthermore the apparatus according to the invention may be constructed such that the passage in the vessel is a composite passage, at least part of the passage being located adjacent the upper side of the vessel and being provided with a closable discharge means.

Apparatus according to the invention may further be so constructed that from the part of the passage located opposite the nozzle a tube which is wide compared with said part of the passage extends downwardly in the vessel, said tube communicating with the interior of the vessel.

Finally the apparatus according to the invention may be so constructed that the lower side of the vessel is provided with a closable discharge means.

To elucidate the invention an apparatus according to one embodiment of the invention will be described with reference to the accompanying drawing, in which.

Figure 1:
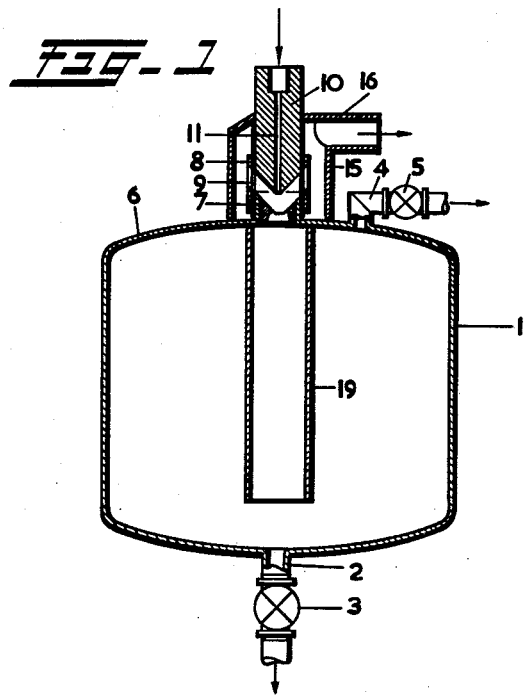
FIGURE 1 is a vertical section of an apparatus provided in accordance with a preferred embodiment of the invention.
Figure 2:
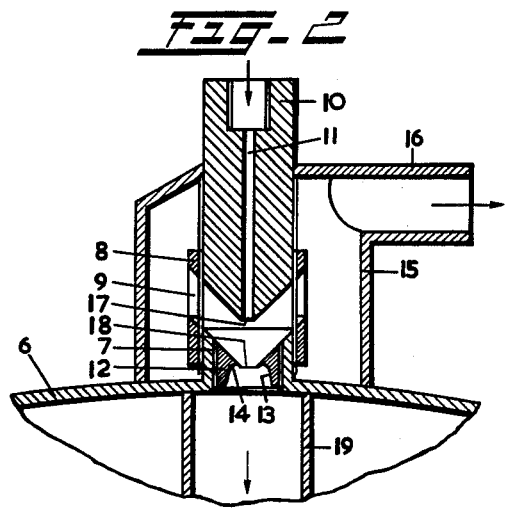
FIGURE 2 illustrates a detail of FIG. 1 on enlarged scale.
Figure 3A:
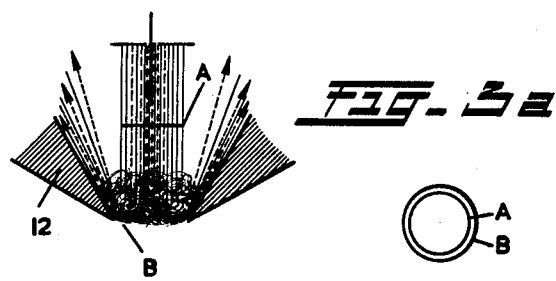
Figure 3B:
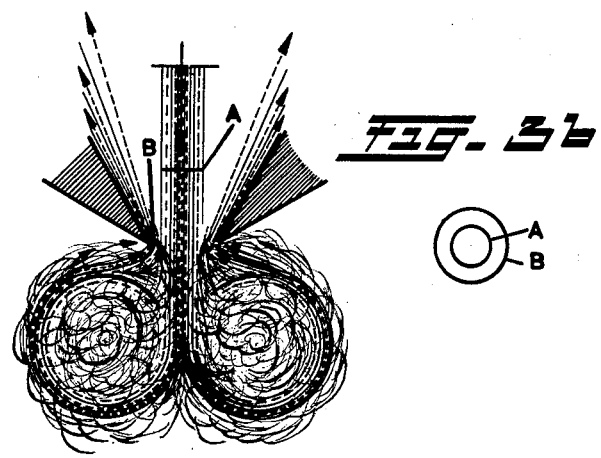
Figure 3C:
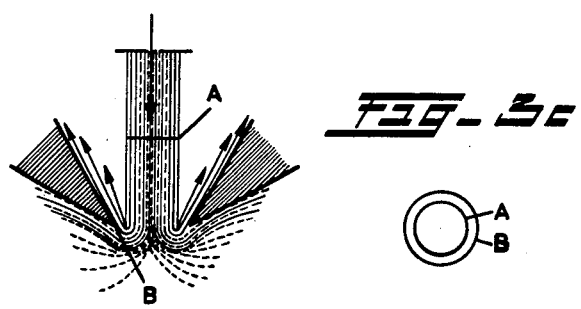

FIGURES 3a-c are detail drawings on a still larger scale illustrating the flow phenomena in a proximity of the collar employed according to the invention.

A substantially round, cylindrical vessel is indicated in the drawing at 1. Said vessel is provided at the lower side with a discharge line 2 including a stop valve 3. At approximately the highest point of the vessel 1 a discharge line 4 provided with a cock 5 is located. The upper wall 6 of the vessel 1 is provided with an upstanding rim 7, which rim is threaded on its outer surface. A tubular piece 8 is threadably engaged on rim 7, which piece is provided with a plurality of ports 9 distributed over its periphery. Into the upper part of the piece 8, a nozzle 10 is screwed. Nozzle 10 has a central ejection channel 11. A line, not shown, connects with the nozzle 10, through which line the liquid to be separated is supplied under pressure. Within the upstanding rim 7 an uninterrupted collar 12 is threadably engaged. The upper side of the rim 7 and the upper side of the collar 12 are so bevelled that together they form a funnel-shaped inlet. The collar 12 ends in a sharp edge 13 which is downwardly inclined. Below edge 13, the material of the collar 12 is slightly conically recessed, as indicated at 14. A cap 15 is disposed about the piece 8 and the nozzle 10, said cap being so connected with the upper wall 6 of the vessel 1 and the nozzle 10 as to be in sealing relationship with said wall and said nozzle. The cap ends in a discharge tube 16.

When the apparatus is put into operation, the cock 3 is closed and the cock 5 is opened. Subsequently the liquid to be separated is supplied under pressure to the nozzle 10. Said liquid flows through the channel 11 and leaves said channel through the opening 17 in the form of a forceful jet which enters the opening 18 of the collar 12. In view of the fact that the channel 11 is cylindrical, the jet leaving the opening 17 will be cylindrical in shape. It is a condition that the jet at the opening 17 be of substantially cylindrical cross-section. This will be effected by appropriately regulating the pressure of the liquid and the distance from the opening 17 to the opening 18.

Due to the described construction, the opening 17 can easily be disposed to be truly coaxial relative to the opening 18. The jet leaving the opening 17 will therefore pass substantially exactly through the center of the opening 18.

At first all of the liquid entering through the opening 18 will remain in the vessel which slowly fills with said liquid. This will continue until the level of the liquid has reached the discharge line 4. The cock 5 is then closed, while the injection of the liquid through the opening 18 is continued. The vessel 1 will then be filled, and the liquid level in the vessel will be at the opening 18. If injection of the liquid is continued after this, the greater part of said further supply of liquid will escape through the ports 9, fill the cap 15 and finally flow away through the discharge tube 16.

The liquid which has passed the separating device leaves said device through the discharge line 16, the liquid being free of the heavier parts. The line 16 consequently leads to a reservoir for the cleaned liquid.

The following may be observed for elucidating the operation of the apparatus.

The jet of liquid entering the vessel through the opening 18 is impelled against the liquid already contained in the vessel. In view of the fact that said liquid already contained in the vessel is confined, the liquid supplied is discharged in a reversed direction in such a manner that the initially downward movement is converted into an upward movement. Below the opening 18 adjacent the axis of said opening, a downward flow of liquid and an upward flow results. Both flows are very rapid and this means therefore that the upward flow leads to an ejection of liquid along the funnel-shaped upper walls of the collar 12 and the upstanding edge 7. The upward flow of the liquid is substantially of saucer-shape and passes through ports 9 to be subsequently discharged. While the injected jet of liquid reverses its direction over a very short distance in the manner described, the radius of the curve traversed is extremely small, the heavier parts in the injected liquid as a result of their greater kinetic energy will separate from the lighter liquid.

Assuming by way of example that the liquid contains heavier solid particles, these heavier solid particles will be propelled downwards, either straight down or according to approximately cone-shaped faces, while the lighter liquid reverses its direction and flows away upwardly.

Assuming the area of the opening 17 is designated as A and the area of the opening 18 is designated as B, the ratio between A and B is of great importance. Starting from the assumption that openings 17 and 18 are round and are coaxially arranged, the cross-section A of the jet leaving the opening 17 will have an area smaller than the area B of the opening 18. In consequence an annular space will be left about the jet adjacent the opening 18, the area of said space being $B-A$. There are then three possibilities, namely:

(a) A is larger than $B-A$;
(b) A is smaller than $B-A$;
(c) A is equal to $B-A$.

To illustrate said three situations, FIGS. 3a–c are provided to show the three possibilities (a), (b) and (c). In each of said figures, a part of the sharp collar 12 is indicated, as well as a vertical downwardly spouting jet with a cross-section A.

Since it is assumed that the vessel is entirely closed, the same amount of liquid as is injected will again leave. If in case (a) the injected liquid could penetrate into the vessel, then the pressure in the vessel would have to be greater than the pressure of the feed, since the same quantity of liquid would flow through the area $B-A$, which is smaller than the area A, as would flow through the area A. Since the pressure in the vessel is a reaction pressure it cannot be greater than the pressure of the feed, whereby the jet will not penetrate into the vessel. The jet will therefore not penetrate opening 18 and will change its direction above said opening, and flow away in sidewards fashion. Above the opening 18 a strong turbulence will be developed whereby the separation particles which were originally in the jet, are mixed throughout the entire amount of liquid feed.

In FIG. 3b, the area $B-A$ is greater than the area A, so that the liquid passing upwardly through the annular opening $B-A$ will have a smaller speed than the liquid entering the vessel. The reaction pressure in the vessel is thus lower than the pressure of the feed, whereby the jet supplying the liquid will penetrate opening 18 to a great depth in the vessel. Also in this case a strong turbulence will develop which affects a fairly large part of the contents of the vessel. The liquid leaving the vessel will contain heavier particles so that there is little separating action in this case.

Good separation between heavier and lighter particles is obtained if the area A is equal to the area $B-A$. If the areas in question are equal, the jet of liquid supplied will penetrate through the opening 18 but only over a very short distance sufficient to make the liquid change direction entirely just below the sharp edge of the opening 18. The effluent liquid has then the shape of a cone or saucer which is so sharply defined that a free space is left between the jet downwardly spouting from the opening 17 and the rebounding liquid flowing upwardly through the ports 9 in the form of a cone. There is no turbulence above the opening 18. Moreover, no turbulence is developed in the vessel since the entering liquid is forced to immediately reverse direction and leave the vessel.

The behavior of the parts of the feed jet will now be described starting from the center of the jet, and then considering the outer portion of the jet.

The heaviest parts located in the center of the feed jet will be impelled straight down into the vessel. Less heavy parts also are impelled downwardly to some extent but if their direction is reversed they will be subjected to extremely great centrifugal forces in view of the very small radius of curvature of the path of the feed jet whereupon said heavier parts are propelled into the vessel (see dotted line in FIG. 3c). The lighter parts to be separated out are then cut off by the sharp collar 12 in such a manner that these parts will also remain behind in the vessel.

As may appear from the foregoing in accordance with the invention the area of the opening through which the amount of liquid enters should be equal to the passage area through which liquid can flow upwardly. If the effluent can flow upwardly through more than one opening, the sum of the areas of the discharge openings should be equal to the area of the opening through which the liquid enters.

In order to promote the downward movement of separated solids, if required, a downwardly extending tube 19 may be connected to the opening 18, which tube is open at the lower end. If the cock 5 is then kept open a little, a weak flow downwardly through the tube 19 will take place which can promote the downward movement of the separated solid particles. Said flow through the tube 19 naturally continues within the vessel 1, but in view of the fact that the cross-sectional area of the vessel 1 is very much larger than that of the tube 19, the upward flow through the vessel 1 will be so weak that there is pratically no chance that solid particles which have collected at the bottom of the vessel 1 will again move upwardly into the discharge line 4. Notwithstanding this the liquid leaving line 4 may, for greater certainty, be fed back to the reservoir containing the liquid still to be separated.

At the bottom of the vessel 1, a deposit of the separated particles will slowly form. Said deposit may be withdrawn occasionally or continuously via the discharge line 2 by opening the cock 3.

It is clear that a plurality of the separating devices as described may be mounted on one vessel, if desired, a tube corresponding to the tube 19 described in the foregoing being mounted below each of said devices, if desired.

As compared with a centrifuge the apparatus described is considerably simpler and cheaper. Moreover, since there are no moving parts, maintenance costs are relatively small. The only part subject to wear is the collar 12, this being a relatively simple part which can easily be replaced from time to time.

What is claimed is:

1. Separating apparatus comprising a vessel including an upper wall and defining an internal enclosure adapted for accommodating a liquid, a circular rim extending upwardly from said wall and defining with said wall an opening permitting access to said enclosure, a cylindrical piece on and encircling said rim and provided with ports, a collar detachably within said rim and including an annular inwardly directed portion defining an opening permitting access to the first said opening, said rim having a top edge which with said annular portion and ports constitute a conical upwardly directed guide, a nozzle having a bore spaced from and directed towards said openings, said bore being of cylindrical configuration with a circular cross-section having an area about one-half the area of the opening in said annular portion, said bore and the latter said opening being in concentric relation, means to direct a liquid through said bore towards said openings, a cap encircling said nozzle, piece and rim and defining a discharge chamber therewith, said cap being mounted on and in sealed relation with said wall, a discharge pipe connected to said cap, and discharge valves connected to said upper wall and at the bottom of said vessel.

2. Apparatus as claimed in claim 2 wherein said rim includes exterior and internal threads, said cylindrical piece and collar threadably engaging said threads.

3. Apparatus as claimed in claim 2 wherein said nozzle terminates in a conical surface corresponding to said guide.

4. Apparatus as claimed in claim 2 including a tube depending from said upper wall and encircling the opening in said wall.

5. Apparatus as claimed in claim 2 wherein said annular portion has an inverted conical lower surface.

References Cited in the file of this patent

UNITED STATES PATENTS

| | | |
|---|---|---|
| 485,915 | Duckham | Nov. 8, 1892 |
| 1,374,625 | Allen | Apr. 12, 1921 |
| 2,634,821 | Chipley | Apr. 14, 1953 |
| 2,648,398 | Chipley | Aug. 11, 1953 |
| 2,715,860 | Walters | Aug. 23, 1955 |
| 2,882,026 | Eichelman | Apr. 14, 1959 |